US011461534B2

(12) United States Patent
Marshall et al.

(10) Patent No.: US 11,461,534 B2
(45) Date of Patent: Oct. 4, 2022

(54) SYSTEM FOR DYNAMICALLY GENERATING CONTENT FOR PROFESSIONAL REPORTS BASED ON CONTINUOUSLY UPDATED HISTORICAL DATA

(71) Applicants: Evan James Marshall, Katy, TX (US); John Paul Marshall, Troy, MI (US); Matthew Frederic Marshall, Farmington Hills, MI (US)

(72) Inventors: Evan James Marshall, Katy, TX (US); John Paul Marshall, Troy, MI (US); Matthew Frederic Marshall, Farmington Hills, MI (US)

(73) Assignee: TECH FOOTING, LLC, Saginaw, MI (US)

( * ) Notice: Subject to any disclaimer, the term of this patent is extended or adjusted under 35 U.S.C. 154(b) by 0 days.

(21) Appl. No.: 16/732,134

(22) Filed: Dec. 31, 2019

(65) Prior Publication Data

US 2021/0200932 A1 Jul. 1, 2021

(51) Int. Cl.
*G06F 40/106* (2020.01)
*G06N 20/00* (2019.01)
*G06F 40/166* (2020.01)
*G06V 30/413* (2022.01)

(52) U.S. Cl.
CPC ......... *G06F 40/106* (2020.01); *G06F 40/166* (2020.01); *G06N 20/00* (2019.01); *G06V 30/413* (2022.01)

(58) Field of Classification Search
CPC .................................................. G06F 40/106
See application file for complete search history.

(56) References Cited

U.S. PATENT DOCUMENTS

| 8,706,680 | B1 | 4/2014 | Macfarlane |
| 2007/0282693 | A1 | 12/2007 | Staib et al. |
| 2008/0040301 | A1* | 2/2008 | Sadagopan et al. ..... G06F 15/18 |
| 2008/0201348 | A1* | 8/2008 | Edmonds et al. ...... G06F 17/30 |
| 2010/0313109 | A1 | 12/2010 | Tsai |
| 2011/0301505 | A1 | 12/2011 | Chen Wang et al. |
| 2013/0073957 | A1* | 3/2013 | DiGiantomasso et al. .................. G06F 3/01 |
| 2015/0039524 | A1* | 2/2015 | Leach et al. ....... G06Q 30/0282 |
| 2018/0012268 | A1* | 1/2018 | Simantov et al. ..... G06Q 30/04 |

(Continued)

OTHER PUBLICATIONS

Paiva et al., Improving pedagogical recommendations by classifying students according to their interactional behavior in a gamified learning environment, Proceedings of the 30th Annual ACM Symposium on Applied Computing, Apr. 17, 2015, DOI: 10.1145/2695664.2695874.

(Continued)

*Primary Examiner* — James J Debrow
(74) *Attorney, Agent, or Firm* — Morriss O'Bryant Compagni Cannon, PLLC

(57) ABSTRACT

A system and method of generating a professional report. The method includes selecting a report subject matter, tagging the report subject matter, providing report suggestions based on the report subject matter and a scoring subprocess, and selecting library content. The method then includes creating a draft report using the selected library content, editing the draft report, submitting the draft report for review, and providing a finalized report.

8 Claims, 6 Drawing Sheets

102

Hey this content is awesome! I like how it is flexible enough to work in a few different reporting situations but presents the needed information. Etc.

There are so many things wrong with this paragraph that I'm not sure where to begin. It seems overly simple for use in most reports, I'm not sure the conclusions are worded well enough, etc.

104

106

Binary classification

(56) References Cited

U.S. PATENT DOCUMENTS

| | | | |
|---|---|---|---|
| 2019/0095507 A1* | 3/2019 | Elisseeff et al. | G06F 17/30569 |
| 2019/0260764 A1* | 8/2019 | Humphrey et al. | H04L 29/06 |
| 2020/0142862 A1* | 5/2020 | Lopez Ruiz et al. | G06F 16/16 |
| 2020/0210955 A1* | 7/2020 | Bar-on et al. | G06Q 10/10 |
| 2021/0182337 A1* | 6/2021 | D'Agostino | G06F 16/908 |

OTHER PUBLICATIONS

PCT International Search Report for PCT/US2020/067477, dated Mar. 23, 2021, 6 pages.

\* cited by examiner

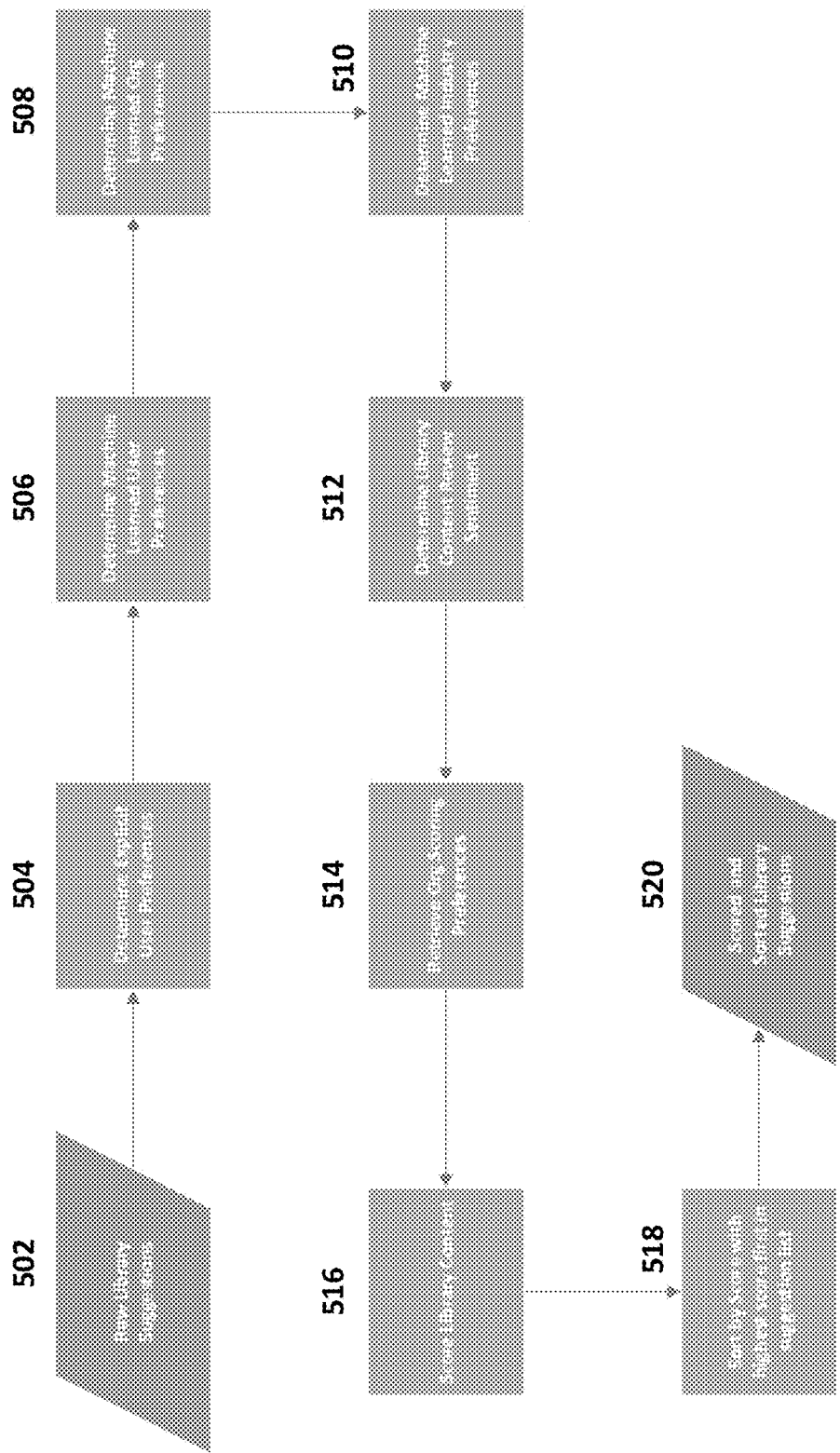

SYSTEM FOR DYNAMICALLY GENERATING CONTENT FOR PROFESSIONAL REPORTS BASED ON CONTINUOUSLY UPDATED HISTORICAL DATA

BACKGROUND

1. The Field of the Present Disclosure

The present disclosure relates generally to accelerated generation of professional reports, and more particularly, but not necessarily entirely, to a system of dynamically generating content and reports based on continuously updated historical or accumulated data.

2. Description of Related Art

Conventionally, the creation of quality professional reports often requires both domain knowledge and some writing skill to do well. Those requirements often result in a very time consuming process for creating these professional reports, even when content may not be entirely unique. Common efforts to lower the length of time needed to create reports often results in uneven and inferior report quality.

Other conventional processes for report generation is often limited to simple data-based reporting, as opposed to the generation of professional reports, which does not account for the problems overcome by the system disclosed herein with the current application.

The prior art is thus characterized by several disadvantages that are addressed by the present disclosure. The present disclosure minimizes, and in some aspects eliminates, the above-mentioned failures, and other problems, by utilizing the system and methods described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instrumentalities and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which:

FIG. 6 is a schematic flow diagram for a scoring subprocess.

DETAILED DESCRIPTION

Figure 1:
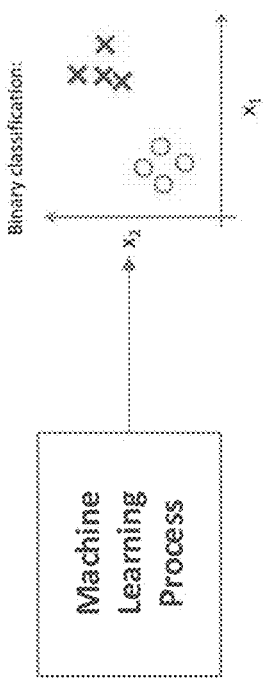
FIG. 1 is a schematic diagram of a machine learning process for sentiment prediction.
Figure 1:

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present systems and methods for generating professional reports are disclosed and described, it is to be understood that this disclosure is not limited to the particular configurations, process steps, and systems disclosed herein as such configurations, process steps, and systems may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or system not specified in the claim.

As used herein, the phrase "consisting essentially of" and grammatical equivalents thereof limit the scope of a claim to the specified steps and elements and those that do not materially affect the basic and novel characteristic or characteristics of the claimed disclosure.

As used herein, the term "complex structured tags" shall refer broadly to the concept of a tags with specific allowed values of various types that can be independent or cascading linked values.

As used herein, the term "image classification" shall refer broadly to the concept of a machine learning mechanism to classify images in a category based on a model created by training the system using images with known categories.

As used herein, the term "industry library" shall refer broadly to the concept of a library that is shared among all users in the same industry.

As used herein, the term "library" shall refer broadly to the concept of a collection of content available for use in reports along with tagging information which describes the context under which the content should be proposed for use.

As used herein, the term "machine learning" shall refer broadly to the concept that a computer can learn and adapt to new data without human interference.

As used herein, the term "macro" shall refer broadly to the concept that a placeholder found within library content which is replaced with other data related to subject matter, customer, etc. when the library content is included in a report.

As used herein, the term "organization library" shall refer broadly to the concept of a library that is shared among all users who belong to the same organization.

As used herein, the term "personal library" shall refer broadly to the concept of a library that is private to an individual user.

As used herein, the term "professional reports" shall refer broadly to the concept of a formal documents intended to deliver information to target recipients.

As used herein, the term "review" shall refer broadly to the concept of an evaluation of the professional report done by an authorized user, which may include, but not limited to, a non-supervising peer.

As used herein, the term "sentiment prediction" shall refer broadly to the concept of a machine learning mechanism to predict sentiment (positive or negative) for reviews based on a model created by training the system using reviews with known sentiments.

As used herein, the term "simple tags" shall refer broadly to the concept of a word or phrase that is free-form in the sense that it does not have to be predefined in the system.

As used herein, the term "subject matter" shall refer broadly to the concept of the information the system is configured to collect about the subject of the desired report.

As used herein, the term "tags" shall refer broadly to the concept of information attached to library content to facilitate the content being proposed in the appropriate circumstances.

As used herein, the term "template" shall refer broadly to the concept of something that serves as a model for how part of the system looks or operates so the desired look or operation does not need to be recreated each time.

The disclosed process may begin with adding professional report content to a library, which may include: personal, organization, and industry libraries, for example. Personal libraries may provide individuals, who may typically be subject matter experts, with the ability to control their own content similar to the control they may have when writing professional reports without access to a library, such as from scratch, for example. The disclosed processes, including all report content, may be utilized, stored, manipulated and/or accessed using known computer systems having known processors and memory commonly used in the field of professional report creation and generation.

Organization libraries may provide desired organizations with a common way of supporting organization approved verbiage and quality control over shared content. Industry libraries may provide individuals and organizations with an opportunity to draw upon publicly, or privately, shared content from others in their industry and to share their own content with the industry at large.

In accordance with the present disclosure, content may be added to a library in at least the following possible ways. First, new content can be added manually by typing or copying and pasting content into a library. Second, new content can be added by uploading a document specially formatted to be imported into a library. Third, new content can be added by uploading past professional reports and having the system parse the content out of those reports and present the content for consideration to be added to a library.

Once content has been added to a library, the library content may then go through an identification and tagging process. This process can use a machine learning logic based on past actions, along with desired system configurations, and desired user tagging.

This tagging feature can offer both simple and complex structured tagging and library content can have unlimited tags applied to it. For example, tags can be in the form of simple free-form tags or complex structured tags with specific allowed values of various types that can be independent or cascading linked values. Tags, especially complex structured tags, may provide a key mechanism in identifying which library content should be suggested in the future based on the subject matter for a given report.

The content can additionally be edited by the user to include macros that are dynamically replaced with contextually relevant details pertaining to the current subject matter, customer, or other features of the report. Text based machine learning logic and configuration settings may also be used to suggest probable macros that the user may want to consider for the content.

Organization and industry libraries can support the option of enabling users to provide feedback regarding library content. The disclosed system may also support machine learning algorithms which may predict a sentiment (positive or negative) for library content feedback. To improve the quality of the sentiment prediction, organizations can choose to have a different sentiment prediction model for each template. The model that is built while teaching the system how to perform sentiment prediction for a given template can then be utilized to predict sentiment as shown in the attached diagrams related to this feature.

In an exemplary embodiment, as shown in FIG. 1, a sentiment prediction process can begin with training a model by feeding into the machine learning process written reviews along with a concrete, or discrete, expressed positive or negative sentiment 102 left either with the review or assessed after the fact by someone reading the review. The result of the training 104 is a binary classification model 106 that can be applied to future reviews that lack a concrete expressed positive or negative sentiment to predict what the sentiment would have been.

Figure 2:
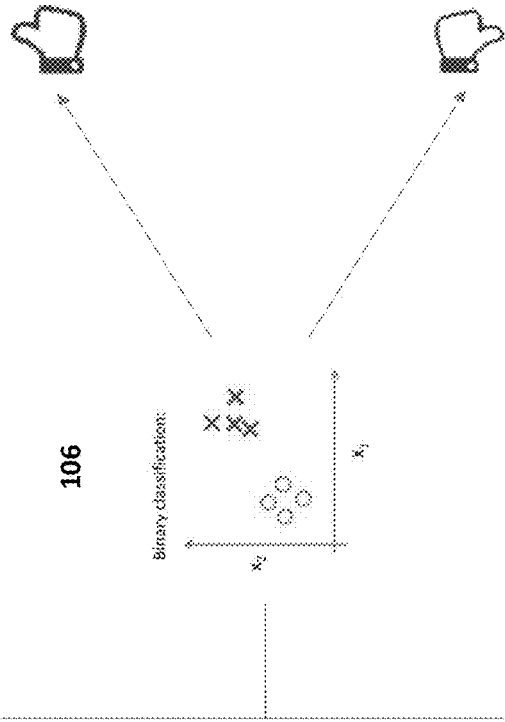
FIG. 2 is another schematic diagram of a machine learning process for sentiment prediction.

In another exemplary embodiment, as shown in FIG. 2, once a binary sentiment model 106 has been created for the organization, it can be utilized to predict the sentiment of reviews 202 that did not have an explicit sentiment associated with it, and accordingly, provide a discrete, concrete sentiment 204, using the binary sentiment model 106.

The disclosed libraries can be continuously added to and refined in order to conform with current industry standards, for example, and to improve the quality and relevance of results provided by the process for future iterations.

Broad use of templates in the disclosed system may facilitate a robust solution that is both customizable and powerful. Each template type may support as many templates as needed or desired, allowing the system to behave differently under varying circumstances.

Templates can control, how complex structured tags are formed, what report subject matter includes and how it is presented to the user, how library tags are associated to report subject matter, the look and feel of generated reports using word processing document templates with custom merge codes that are utilized to place subject matter information on the reports as well as selected library content.

Subject matter may represent the information the disclosed system may be configured to collect about the subject of the desired report. Details about what information is collected for the report subject may depend on the templates selected by the user, but often includes information that needs to be presented in the body of the report as well as information that is used as tags associated with library content to influence what library content is proposed during the report creation process. For example, reports related to structural forensics may have a subject matter that requests information about a property and structures on the property.

Details, like what materials were used for various parts of the structures, like roofing, walls, foundation, are collected as part of the subject matter. Also collected, may be, details about what items were damaged and the cause of damages. This information may help form or compose the tags that link to library content that is appropriate for the subject of this report. Subject matters may vary greatly across industries and field.

When a new report is needed, the user may pick the templates that best fit the user's needs or desires and makes selections within the disclosed system of various parameters that make up the subject matter for the new report. Personal, organization, and/or industry library content that may be suitable for the report can then be utilized in at least the following ways. Suitable content may be suggested based on, configuration settings, keyword searches, subject matter matches with simple tags and/or complex structured tags, machine learning logic based on prior experience with the system.

Any library content that may be selected by the user based on a keyword search that does not match the tagging typically used to suggest library content, can begin to have tagging inferred and, if used more than a predetermined number of times selected in the organization configuration, will begin to be suggested based on inferred tagging in the absence of explicit tagging. This inferred tagging can then be done on a personal, organization, or industry basis.

Suitable content may also be scored for relevance based on direct user interaction (e.g. user indicating they "like" certain text) and users can select a preferences, such as, they love, like, dislike, or block content which may influence the score given to that content. Suitable content may be, scored for relevance based on machine learning of inferred user preferences, and as users utilize library content for reports, their behavior may be observed and repeated use of the same library content can begin to influence the score given that content without any explicit action by the user other than using the content in reports.

Suitable content may be scored for relevance based on machine learning of inferred organization-wide preferences, and based on organization configuration of the system, library content from the organization library that is popular within the organization can have its score influenced based on that popularity.

Suitable content may be scored for relevance based on machine learning of inferred industry-wide preferences and based on organization configuration of the system, library content from industry libraries that is popular within the industry as a whole can have its score influenced based on that popularity.

Suitable content may be scored for relevance based on library content feedback sentiment explicitly noted or inferred via machine learning, and as disclosed above, users may be allowed to leave feedback on organization and industry library content. That feedback may leave an explicit sentiment, or a machine learned sentiment may be applied. Based on organization configuration of the system, that sentiment can then be utilized to influence the score given to library content.

Suitable content may be, suggested library content which may be presented to the user in score descending order so library content with the highest score may be presented at the top of the results; selected, sorted and arranged by the user for appearance in the report; and/or refined or expanded with additional user input.

The report may then be compiled into a draft document using the templates the user selected as well as text that was selected from the suggestions offered by the disclosed system. This draft document may then be created with any macros being resolved to text that is appropriate based on the subject matter and/or other report selections. That draft document can then be downloaded in order to be further edited or refined manually by the user and uploaded back into the system.

Users can upload documents or pictures to be included as attachments to the report with an unlimited number of attachments supported. Images can be edited within the system in order to improve the usability of the image in the professional report. A template can be utilized to control the layout of images in reports.

Figure 3:
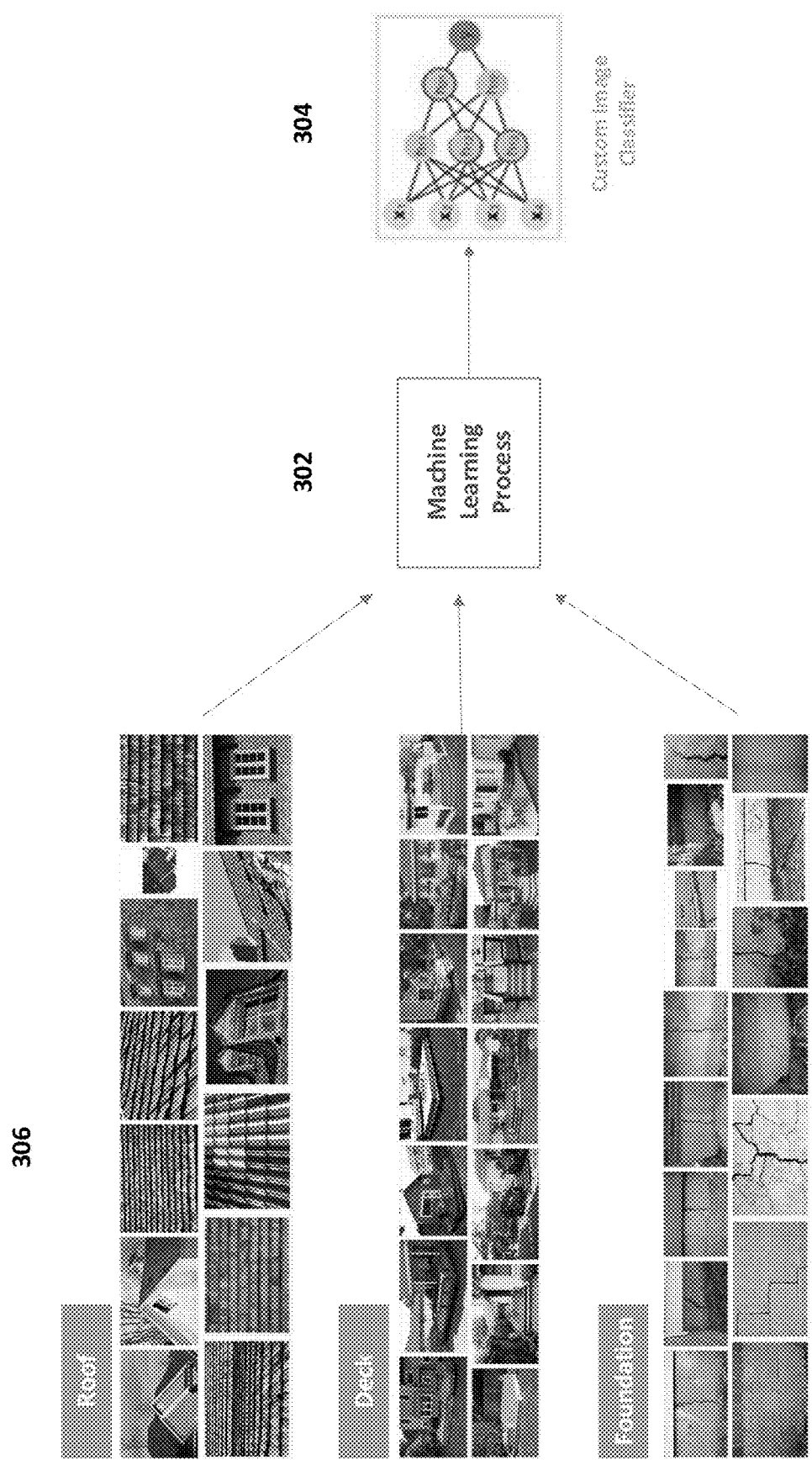
FIG. 3 is a schematic diagram of a machine learning process for image classification.
Figure 4:
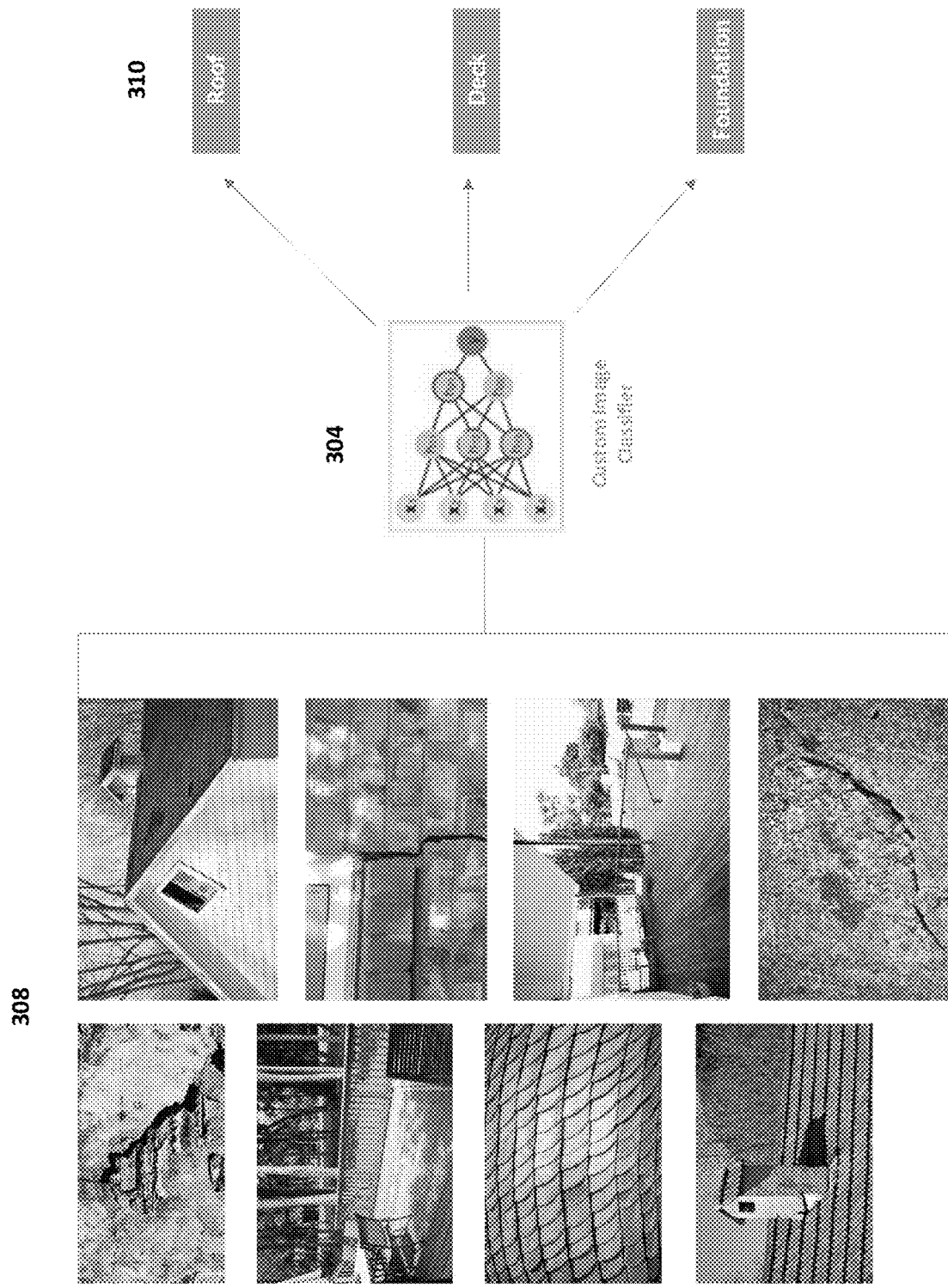
FIG. 4 is another schematic diagram of a machine learning process for image classification.

For reports that include images related to the subject matter of the report, the disclosed system may support machine learning algorithms or processes 302, as shown in FIGS. 3 and 4, to enable customers to create a custom image classifier 304, which may be done by training the disclosed system based on a transfer learning approach, to produce a custom image classifier trained on, for example, a customer's own images 306. The resulting classifier 304 can then automatically classify images 308, and such classification 310 can be added to future reports. To improve the quality of the image classifier, organizations can choose to have a different image classifier for each template. Once the report content is ready to be finalized, the report can be combined with the attachments for rendering into a final report.

The disclosed system may support a report review process where authorized users, supervisors or peers can review the professional reports created by the system and refined by the user who is the report author. The system can significantly improve the speed and focus of the review process by identifying differences between the report and library text that has already been vetted and approved by the organization.

Authorized users, supervisors and peers can leave review notes for report authors to provide feedback on things that need attention. The review process may provide metrics that can be used to identify report authors and/or report reviewers who may need additional training or coaching on report creation or review techniques.

Figure 5:
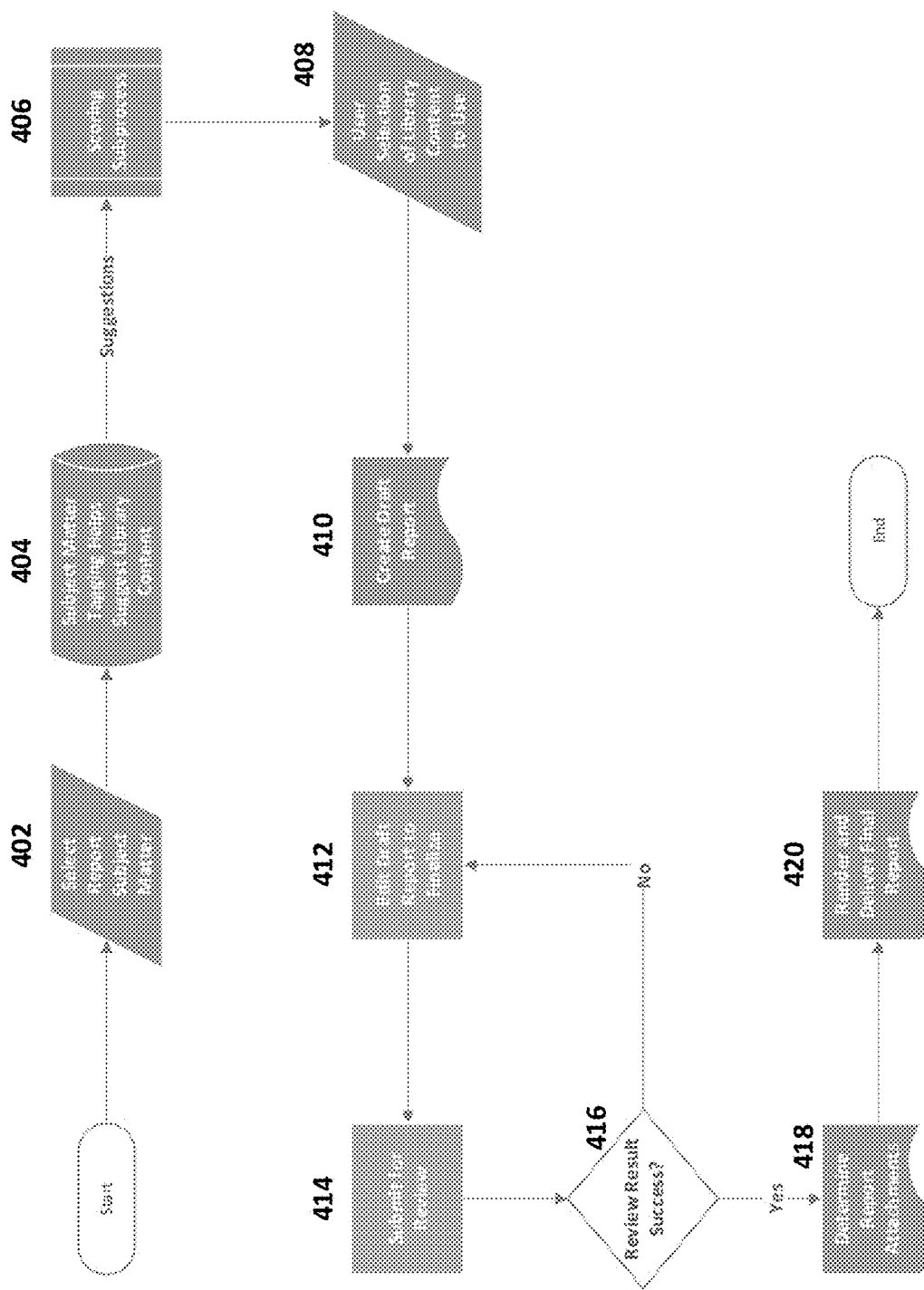
FIG. 5 is a schematic flow diagram for report generation.

In an exemplary embodiment, as shown in FIG. 5, the disclosed system can generate or create a report by, selecting a report subject matter 402, then subject matter tagging can suggest library content 404. The disclosed system can then provide suggestions based on a scoring subprocess 406 (to be explained in more detail below), then a user can use the system to select library content to use 408. After the library content is selected a draft report may be created 410. A user can then edit and finalize the draft report 412, which can then be submitted for review 414. A review 416 results in either a finalized report, or enables a user to further edit the report prior to additional review. Once the review 416 is successful, the system can be used to determine report attachments 418, and render deliver a final report 420.

In another embodiment, as shown in FIG. 6, the scoring subprocess 406 (identified above) can include: receiving raw library suggestions 502; determining explicit user preferences 504; determining machine learned user preferences 506; determining machine learned organization preferences 508; determining machine learned industry preferences 510;

and determining library content review sentiment 512. Then the system can retrieve organization preferences 514, and then score the library content 516. Once the library content has been scored, the system can sort by score first in the suggestion list 518, and then the system can provide a scored and sorted library suggestions 520.

The disclosed system may also include management features, such as, enabling maintenance of a list of authorized users with groups and access rights; a customizable email notification related to report status; a customizable user dashboard; data based management reporting regarding various aspects of system use, allowing organizations to enable or disable different features based on their own needs; providing insights into organization and personal library creation and use; exporting and importing of complex structured tag data using spreadsheets; and exporting and importing of library contents using word processing documents.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of generating professional reports, comprising:
    selecting a report subject matter;
    inferred tagging of the report subject matter and library content, wherein inferred tagging is determined by machine learning based on repeated user selections that do not match initial tagging of report subject matter and library content;
    providing scored library content suggestions for a draft report based on the tagging of the report subject matter and sentiment prediction which utilizes a machine learning mechanism to predict sentiment for reviews based on a model created by training the machine learning mechanism using reviews with known sentiments;
    presenting a user with a plurality of scored suggested library content based on the inferred tagging and the sentiment prediction;
    selecting at least one of the plurality of the scored suggested library content;
    creating the draft report using the selected scored suggested library content;
    editing the draft report;
    submitting the draft report for review; and
    providing a finalized report.

2. The method of claim 1, further comprising:
    determining report attachments for the final report.

3. The method of claim 1, wherein the tagging includes a machine learning process based on past user data.

4. The method of claim 1, further comprising:
    attaching at least one image to the report, wherein an image classifier automatically classifies the image based on a machine learning process.

5. The method of claim 1, wherein report suggestions are also based on the report subject matter.

6. The method of claim 1, wherein the tagging includes a machine learning process based on organization preferences.

7. The method of claim 1, wherein the tagging includes a machine learning process based on user preferences.

8. The method of claim 1, wherein the tagging includes a machine learning process based on industry preferences.

* * * * *